July 16, 1946.  F. S. CARVER  2,404,165
PRESSING APPARATUS
Filed March 4, 1943  2 Sheets-Sheet 1
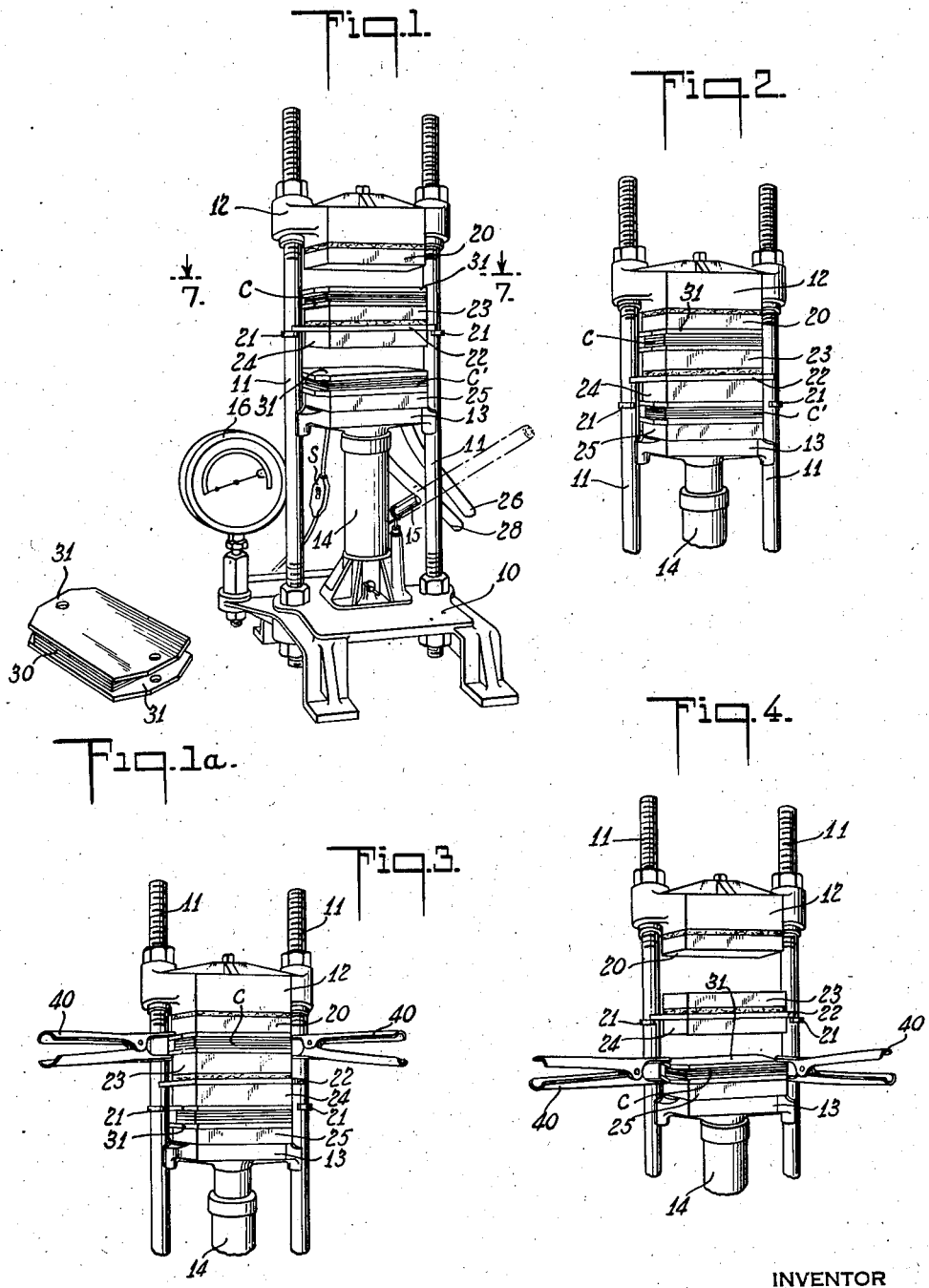
INVENTOR
FRED S. CARVER
BY
ATTORNEY July 16, 1946.　　　F. S. CARVER　　　2,404,165
PRESSING APPARATUS
Filed March 4, 1943　　　2 Sheets-Sheet 2
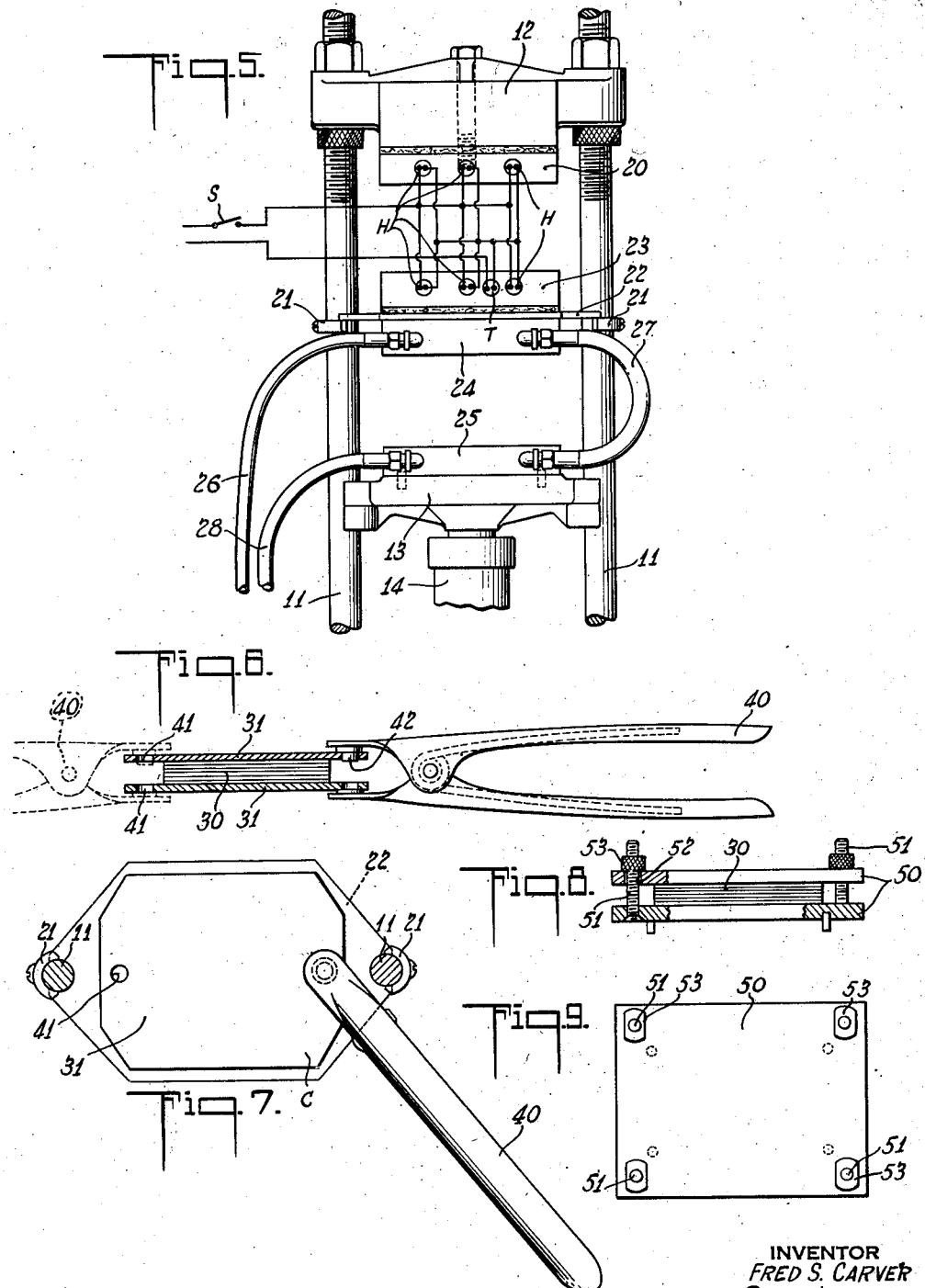
INVENTOR
FRED S. CARVER
BY
*Joseph H. Chaines*
ATTORNEY Patented July 16, 1946

2,404,165

UNITED STATES PATENT OFFICE 2,404,165

PRESSING APPARATUS

Fred S. Carver, Short Hills, N. J.

Application March 4, 1943, Serial No. 478,025

2 Claims. (Cl. 154—1)

The present invention relates to pressing apparatus, and is more particularly directed toward apparatus suitable for expeditiously producing tamper-proof identification cards.

Such cards have heretofore been subjected to a treatment by which each card is placed between two sheets of plastic material and subjected to heat and pressure and then to a cooling operation, so that the three thicknesses of material are laminated into a unitary article in which the card is laminated between and embedded in the plastic sheets.

The making of these tamper-proof identification cards is to a large extent a hand operation, as they must be prepared after the data, such as the photograph, the thumb print and the information, has been collected and placed on the card.

According to the methods previously available a number of "sandwiches," each composed of one or more cards inserted between two sheets of plastic material and a pair of polished plates and blotters, is built up into a stack, and this stack placed between the platens of an hydraulic press. The press is closed, the platens electrically heated to the proper temperatures for the necessary time, and then cooled by running water through them in order to complete the molding or laminating operation whereby the card is sealed into the plastic. Owing to the length of time required for heating the press and then cooling it, the operating cycle is slow and the production from a single opening press limited.

The present invention contemplates the preparation of the tamper-proof identification cards in a much more expeditious manner, and according to the present invention the press is provided with a pair of platens to be heated and maintained hot so long as the press is in operation and another pair of platens adapted to be cooled and kept cool so long as the press is in operation. Then one stack can be subjected to heat and pressure, while another stack is being cooled under pressure, the hot stack being shifted between pressings from the heated platens to place it between the cooled platens and the cold one removed. In order to maintain the stack which has been heated and placed under sufficient pressure while the press is opened for transfer of this stack to the cold platens, clamps are preferably used on the hot stack so that the release of the pressure between the platens will not relieve the stack from pressure. The pressure maintenance can according to the present invention be readily accomplished by suitable forms of clamping device which can be secured to the stack while between the heated platens, and then used as handles to transfer the heated stack from between the hot platens to insert it between the cold platens of the press.

The accompanying drawings illustrate the present method involved and a suitable form of apparatus for carrying out the process.

In these drawings:

Figure 1 is a perspective view of the press open and carrying two charges;

Fig. 1a is a perspective view of a charge out of the press;

Figure 2 is a fragmentary perspective view of the charged press closed;

Figure 3 is a perspective view similar to Figure 2 showing the application of clamping means to the hot charge;

Figure 4 is a perspective view illustrating the press in open position and the heated charge shifted in betwene the cold platens;

Figure 5 is a rear elevational view of the press open and illustrating the wiring diagram for heating and cooling the water connections;

Figure 6 is an enlarged sectional view through a charge, also illustrating a form of clamp;

Figure 7 is a horizontal sectional view taken on the line 77 of Figure 1, showing the clamps in position;

Figure 8 is a side elevational view with parts in section of a modified form of charging device; and Figure 9 is a top plan view of the same.

In Figure 1 the base of the press is indicated at 10, the columns at 11, 11, the head of the press at 12 and the ram at 13. The ram is under the control of a hydraulic jack indicated at 14 with operating handle and extension lever 15 and pressure gauge 16.

The head 12 supports an upper platen 20. The columns 11, 11 are provided with stops 21, 21 shown more in detail in Figure 7. These stops are placed a sufficient distance below the head of the press so that they may support a plate 22 and a platen 23, the latter being spaced a sufficient distance below the fixed platen 20 to accept a charge when the press is open. The plate 22 also supports a platen 24, while the ram 13 supports a platen 25. The platens 23 and 24 move up and down along the columns as a unit.

The upper two platens 20 and 23 are provided with electric heaters, diagrammatically illustrated in Figure 5 at H, and one of them carries a thermal cut-out T arranged in series with all the heaters so that the maximum temperature of the platens 20 and 23 is controlled by switch S. The lower platens 24 and 25 are provided with hose connections 26, 27 and 28 whereby cooling water may be circulated through them.

A suitable number of sandwiches consisting of card and plastic sheets with polished plates and blotters is assembled in any convenient manner. Such a stack is diagrammatically illustrated at 30 at the left of Figure 1 and in Figure 6. The stack is placed between two heavy metal plates 31, 31 and when cold the plates and interposed stack can be easily handled together. When the press is open, as in Figure 1, an upper charge C comprising the sandwiches and plates is placed between the upper two heated platens. A similar stack can be placed as a dummy between the two lower platens for the first pressing or it may be omitted as desired. Such a stack is, however, indicated in the drawings at C'. The press is then closed bringing the parts to the position indicated in Figure 2 and, while the press is closed and the upper charge C being subjected to heat and pressure, the operator takes two clamps, such as indicated at 40, 40, and places them on the upper charge C.

The clamps 40 may take various forms and a suitable convenient style of clamp is illustrated in the drawings. It is a simple, spring clamp, and in order to insure the best alignment and centering of the clamps and the pressure plates 31, 31, the pressure plates may be provided with holes 41, while one nose of each clamp is provided with a pin 42 to fit one of these holes. The clamps are inserted in between the columns 11, 11 in diagonal positions somewhat as illustrated more clearly in Figure 7. When the two clamps are placed on the upper charge they will project from the press as illustrated in Figures 3 and 7. When the clamps are in this position the release of the pressure in the press does not wholly relieve the pressure between the pressure distributing plates 31, 31, therefore the hot plastic can be held under pressure and prevented from expanding, bubbling, and the like, which would impair the product. The clamps are available as handles to remove the hot charge C, and the charge can then be inserted between the cold platens as indicated in Figure 4. A new charge will then be placed between the upper platens, the press again closed and held closed while the operator can remove the clamps from the lower charge, attach them to the upper charge, attend to the preparation of a new charge to be inserted in the press and separate the completed work.

It will be noted that according to the improved operational procedure the upper two platens are kept hot, while the lower two platens are kept cold. No time is lost with heating and cooling of the platens and the output of the press can be about four times the output of a similar press having only one pair of platens which are alternately heated and cooled.

In the modified form of construction illustrated in Figures 8 and 9 the stack 30 is between two pressure distributing plates 50, 50. One of these plates is provided with screws 51 with a steep pitch thread, forming studs which pass through holes 52 in the other plate, and thumb nuts 53 are tightened up when the charge is under pressure so that the charge can then be removed and replaced between the cold platens for quick chilling.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A vertically acting press for carrying out a hot pressing operation and a cold pressing operation at the same time and having a movable ram, columns, a head fixedly carried by the columns, an upper pair of platens, a lower pair of platens, one of one pair being fixedly secured to the head of the press, one of the other pair being carried by the ram, the other platens being insulated from one another and secured together to move as a unit, heating means carried by the platens of one pair to maintain them continuously heated to a predetermined temperature, cooling liquid circulating means for continuously chilling the other pair of platens, means for guiding said unit for movement up and down, and means limiting the lowering of the unit to such an amount as to space the upper pair of platens apart to permit the insertion and removal of a charge and support the upper platen of the second pair above the lowermost position of the lower platen a distance to permit the insertion and removal of a second charge, the press being closable to simultaneously apply pressure to both charges.

2. A vertically acting press for carring out a hot pressing operation and a cold pressing operation at the same time and having a movable ram, columns, a head fixedly carried by the columns, two pairs of platens, one of the platens of one pair being fixedly secured to the head of the press, one of the platens of the other pair being carried by the ram, the other platens being insulated from one another and secured together to move as a unit, heating means carried by the platens of one pair to maintain them continuously heated to a predetermined temperature, cooling liquid circulating means for continuously chilling the other pair of platens, means for guiding said unit for movement up and down, and means limiting the movement of the unit to such an amount as to space the pairs of platens apart to permit the insertion and removal of a charge between each pair, the press being closable to simultaneously apply pressure to both charges.

FRED S. CARVER.